Nov. 11, 1958  E. E. TEUBNER  2,859,667
MACHINE TOOL TABLE MECHANISM
Filed Jan. 8, 1954  4 Sheets-Sheet 1

INVENTOR.
EDMUND E. TEUBNER
BY
ATTORNEYS.

INVENTOR.
EDMUND E. TEUBNER
BY
ATTORNEYS.

Nov. 11, 1958　　　E. E. TEUBNER　　　2,859,667
MACHINE TOOL TABLE MECHANISM
Filed Jan. 8, 1954　　　　　　　　　　　　4 Sheets-Sheet 3

INVENTOR.
EDMUND E. TEUBNER
BY
ATTORNEYS

Nov. 11, 1958    E. E. TEUBNER    2,859,667
MACHINE TOOL TABLE MECHANISM
Filed Jan. 8, 1954    4 Sheets-Sheet 4
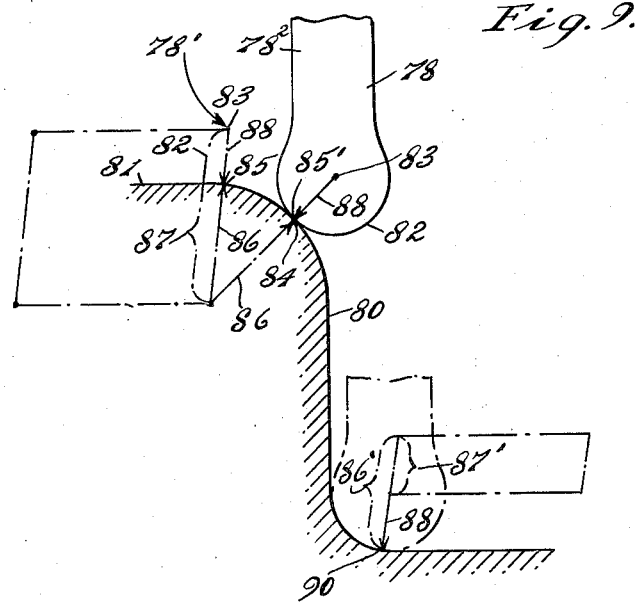
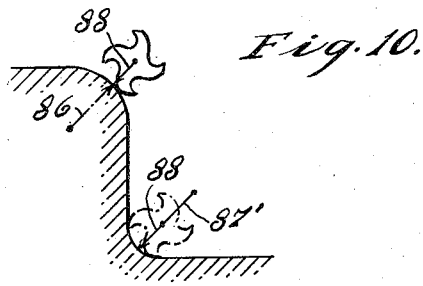
INVENTOR
Edmund E. Teubner
BY
ATTORNEYS.

United States Patent Office 2,859,667
Patented Nov. 11, 1958

2,859,667
MACHINE TOOL TABLE MECHANISM
Edmund E. Teubner, Drexel Hill, Pa.
Application January 8, 1954, Serial No. 402,836
8 Claims. (Cl. 90—18)

The present invention relates to machine tool tables of the type which are adapted to be used as auxiliary work tables or as tool carrying heads in connection with machine tool operations such as milling, shaping, contour forming, grinding, and the like.

A purpose of the invention is to obtain intricate shapes of work path or tool path by relatively simple and reliable mechanism.

A further purpose is to make the position of the work or the tool in formation of intricate pieces by milling or the like more readily reproducible by simple adjustments of a dial setting nature.

A further purpose is to permit movement of the work or the tool in an arc while keeping the table effectively facing in the same direction, and permitting at any time movement of the table in a linear direction at any desired angle with interruption of arcuate motion for any desired distance, and resumption of arcuate motion at any time after linear motion has been carried on as far as necessary; all without relocating the work or tool position reference point in the measuring system of the machine tool on which the invention is employed.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 9 is a diagram transverse to the direction of motion of the contour in cutting, showing the setting of the crank radius with respect to the tool radius and the work radius for convex and concave cuts using a shaper, while Figure 10 is a similar view illustrating the relationships for a milling operation.

Figure 1:
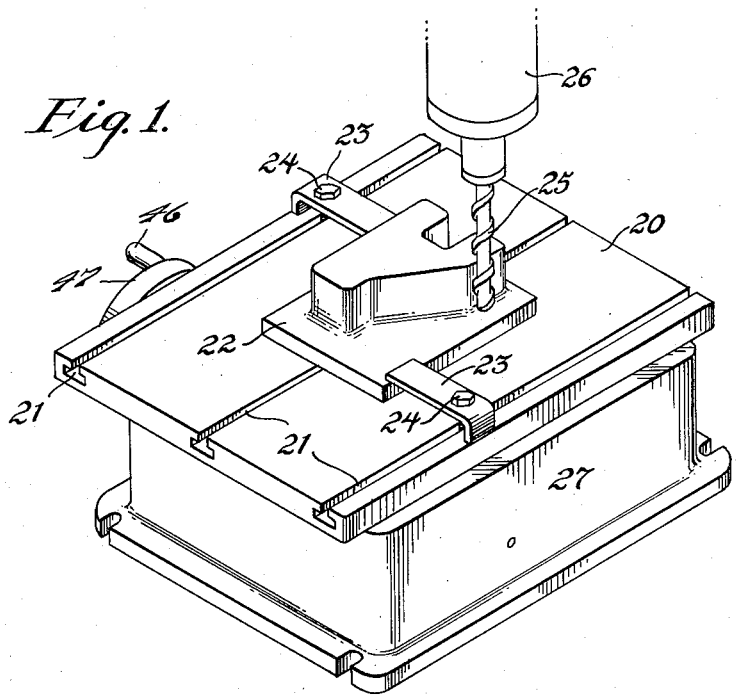
Figure 1 is a perspective showing the table of the invention applied as a work table suitable for mounting on the table of a conventional milling machine.
Figure 2:
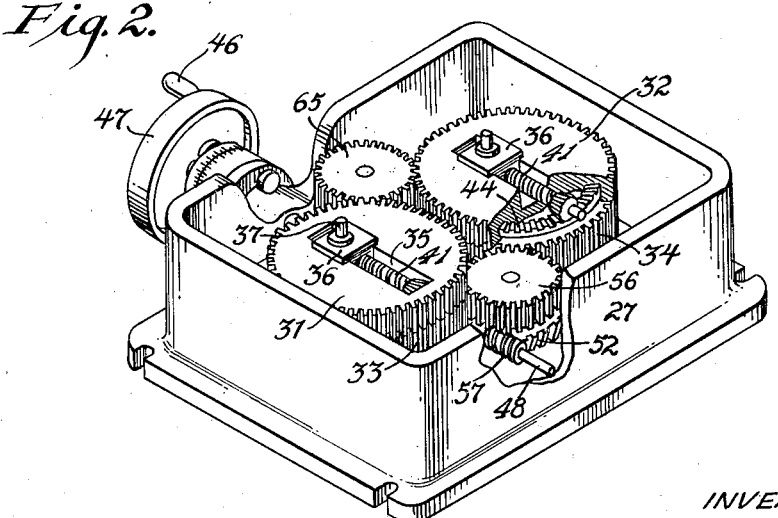
Figure 2 is a perspective view corresponding to Figure 1 showing the table removed and making the internal structure visible.
Figure 3:
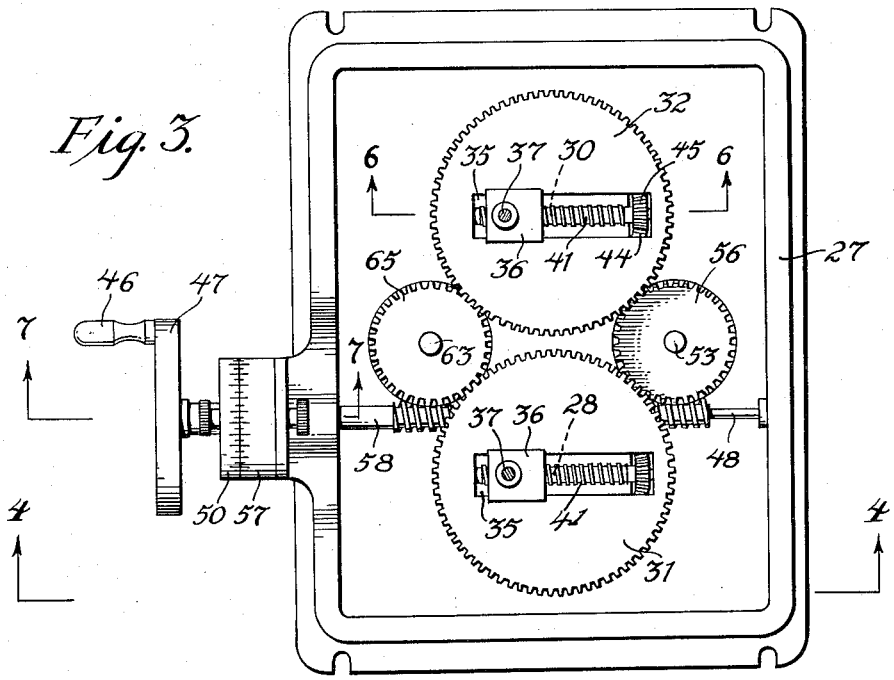
Figure 3 is an enlarged top plan view of the device of Figures 1 and 2, with the table removed on the section line 3—3 of Figure 4.
Figure 4:
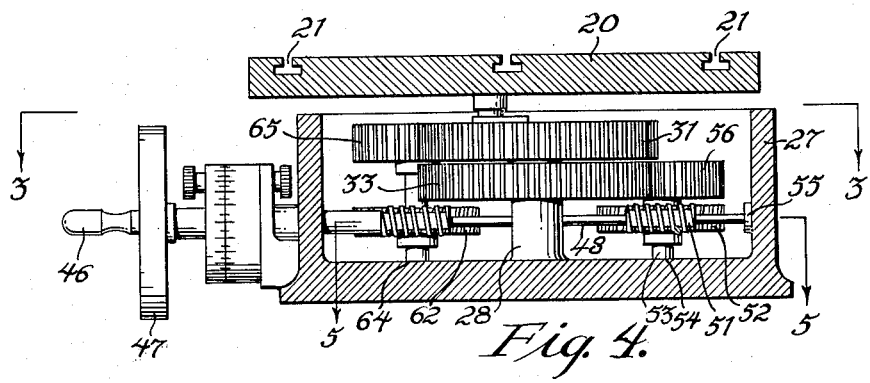
Figure 4 is a section on the line 4—4 of Figure 3.
Figure 5:
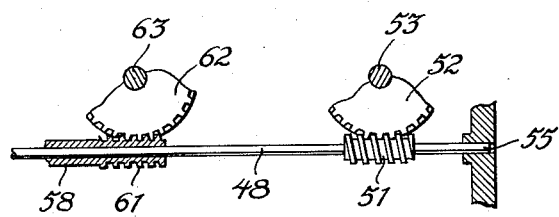
Figure 5 is a fragmentary section on the line 5—5 of Figure 4.
Figure 6:
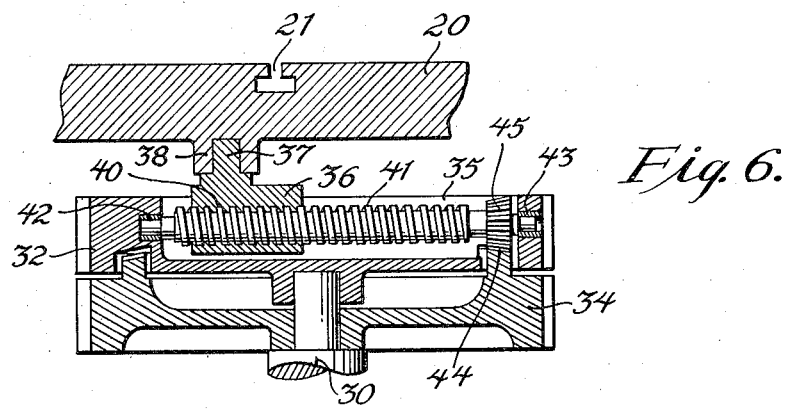
Figure 6 is a fragmentary enlarged section on the line 6—6 of Figure 3.
Figure 7:
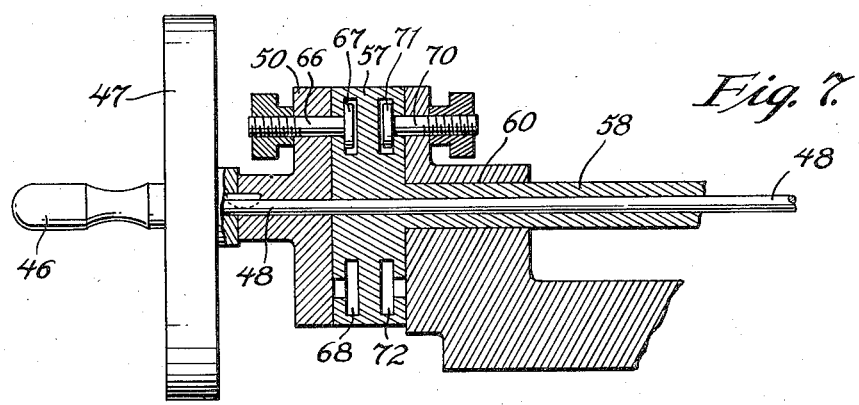
Figure 7 is a fragmentary enlarged section on the line 7—7 of Figure 3.

Describing in illustration but not in limitation and referring to the drawings:

The invention is applicable to a table of the character which will be used either to support the work when it is undergoing a contour-forming operation such as milling, routing, profiling, slotting, or the like, or permissibly to support the tool for any such operation when the work is to be stationary and the tool is to move.

It has been difficult in the prior art to move the tool or the work along an arcuate path or along a more complex path with high accuracy and easy reproducibility of the motion. The present invention is designed to permit arcuate movement along any selected radius and also to permit linear motion at any angle while arcuate motion is stopped, with permissible resumption of arcuate motion at a different radius whenever this is desired. Thus the operation is controllable and a wide variety of curved and complex contours can be obtained for the purpose of machining parts of metal, wood, plastic or other suitable material.

In accordance with the drawings, the device of the invention consists of a table 20 having the usual T-slots 21 and in the form shown in the drawing mounting a work piece 22 by work clamps 23 through bolts 24 entering T-head nuts in the T-slots, as well known in the art. As explained, the table can if desired carry a tool such as a shaping cutter or lathe turning tool. For placement purposes, Figure 1 shows milling cutter or other suitable tool 25 extending down in vertical position and driven by spindle 26.

It will, of course, be evident that the work table can if desired be guided or supported for sliding motion.

A housing 27 contains pivots 28 and 30 which pivotally mount crank rotation gears 31 and 32, which are relatively above, and crank arm control gears 33 and 34, which are below and which are in the preferred form respectively of the same diameter and pitch as the crank rotation gears, and respectively on the same axes. The axes 28 and 30 are spaced but parallel to one another.

Each of the crank rotation gears 31 and 32 is of the same diameter and has a radial guideway 35 which is parallel on the two gears and in each case supports a guide block 36 which mounts a crank pin 37 which pivotally connects with a pivot 38 on the underside of the table 20.

Each guide block 36 has a radially extending female thread 40 which threads with a radially extending screw 41 journalled at 42 and 43 at opposite points on the diameter of one of the crank rotation gears 31 or 32.

Each of the crank arm control gears 33 or 34, besides its outside gear teeth has bevel crown gear teeth 44 on its upper face which mesh with a bevelled pinion 45 mounted on the screw 41.

The crank rotation gears 31 and 32 are driven by a handle 46 on a crank arm 47 on shaft 48 carrying clutch disc 50 and carrying at its inner end worm 51 meshing with worm gear 52 on shaft 53 journalling in the housing at 54. Shaft 48 journals in the housing at 55. Shaft 53 carries mounted thereon pinion 56 which meshes with the external gear teeth on crank arm control gears 33 and 34, turning them both in the same direction.

Clutch disc 57 surrounding and free from shaft 48 is secured on tubular shaft 58 which is around shaft 48 and journalled in the housing at 60. Tubular shaft 58 carries at its inner end worm 61 (suitably identical with worm 51) which meshes with worm gear 62 (suitably identical with worm gear 52) on shaft 63 which journals in the housing at 64 and carries at its upper end pinion 65 which is desirably of the same diameter and same number of teeth as pinion 56 and which meshes with crank rotating gears 31 and 32 to turn them in the same direction.

The two clutch discs 50 and 57 may be clamped so that they will turn together by tightening clamping bolt 66 having T-head 67 in circular T-slot 68 of clutch disc 57.

In case clamping bolt 66 is unclamped, clutch disc 57 can be clamped in stationary position by tightening clamping bolt 70 having T-head 71 in circular T-slot 72 on the opposite face of the clutch disc 57.

In operation, if it is desired to move the work table in an arcuate path while the table always faces in the same direction, clutch discs 50 and 57 are clamped together and handle 46 turns both shafts. Since gears 31 and 32 are of the same diameter and the same number of teeth as gears 33 and 34 and also are each of the same diameter and number of teeth, since the cranks are always on the same crank arm, the screws 41 are of the same pitch, the pinions 56 and 65 are of the same diameter and number of teeth, and the worms and worm wheels are of the same diameter and pitch, the work table will make a parallelogram motion about the axes 28 and 30 conforming to the arcs of the cranks for the opposite ends of the parallelogram.

At any point where this parallelogram arcuate motion is to be interrupted, it is merely necessary to release clamping bolt 66 and tighten clamping bolt 70, which causes crank rotating gears 31 and 32 to remain stationary. Any turning of handle 46 then causes the table to move in a straight path at the angle corresponding to the angle of the guideways 35. When arcuate parallelogram motion is to be resumed, it is merely necessary to loosen clamping bolt 70 and tighten clamp bolt 66 and continue to turn handle 46.

Figure 8:
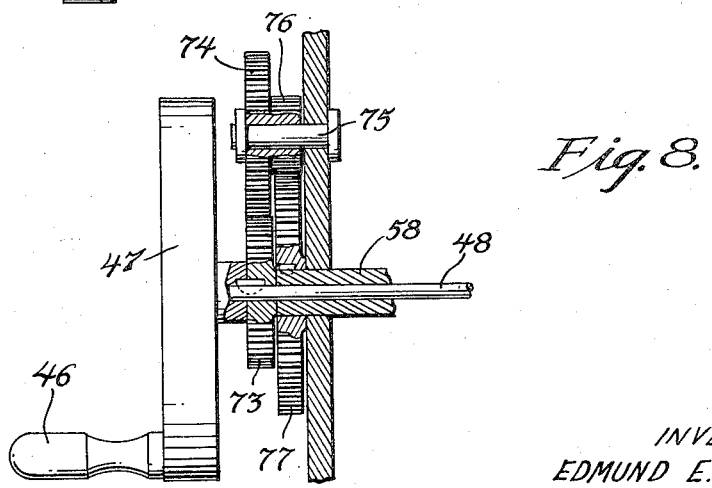
Figure 8 is a view corresponding to Figure 7 showing a modification.

In some cases it is desired to obtain a combination of the arcuate parallelogram motion and the linear angular motion, and this can be done as shown in Figure 8, by providing a gear 73 keyed on shaft 48 which engages gear 74 idling on shaft 75 supported on the housing, and rigidly connected with gear 76 which meshes with gear 77 which is keyed to tubular shaft 58. Thus the crank rotating gears and the crank arm control gears turn at a predetermined ratio which establishes a path deviating from a circle or a straight line when handle 46 is turned.

It will be evident that in combination with the standard motion of the machine tool on which it is mounted, the device can be applied for forming internal and external cuts as desired. The cutter diameter will be less than that of the smallest arc to be formed on the work. The cutter radius is subtracted from the amount of crank offset for concave cuts and added to the amount of crank offset for convex cuts. The clutch discs will desirably carry scales to aid in setting the table correctly.

To amplify the previous statement, it will be evident on Figure 9 that where a shaper-type of tool 78 is employed moving in a path transversely to the plane of the paper, to machine a contour 80 on work 81 which extends transversely of the plane of the shaper in conformity with the same cross sectional contour illustrated, the cutting surface of the tool 82 should conform to a portion at least of a circle having a center 83 throughout the entire cutting portion which is to have contact with the work. When producing a convex contour 84 on the work, it will be evident that the tool in position 78' is tangent to the work at 85 and the setting or radius of the crank 87 is equal to the radius 88 of the curvature of the cutting surface of the tool plus the radius 86 of the curvature desired on the work. Similarly at another position $78^2$ of the tool where the tool is tangent to the work at 85', the same condition obtains.

On the other hand, when the tool is cutting a concave contour on the work at 90, the crank setting or radius 87' will be set to equal the radius desired on the work 86' minus the radius of the tool 88.

In the case of a milling cutter or similar rotary tool as in Figure 10, an exactly similar condition obtains, the radii of the curvature of the tool and the curvature of the work being added to determine the crank setting on convex surfaces and being subtracted to determine the crank setting on convex surfaces.

It will be evident that setting the clamps and turning of the handle 46 causes the table to describe either an arcuate path with the edges of the table parallel to the edges of the housing or to move in a straight line for a limited distance at any desired angle to the edge of the housing. This latter feature will, of course, be used to set the desired radius or to produce a straight line cut at any angle.

In a preferred embodiment the large gears 31, 32, 33 and 34 have a ratio of 2 to 1 to the pinions 56 and 65. The worms and worm gears are double lead having a ratio of 1 to 12. The bevel pinions have a ratio of 1 to 6 to the crown gears. The screws 41 have pitch of 10 threads to the inch. The disc 50 has 25 equally spaced graduations giving a linear motion to the crank pins 37 of one thousandth of an inch per division. The disc 57 has 15 equally spaced graduations indicating an arcuate motion of crank pin 37 of one degree per division.

Having thus described my invention what I claim as new and desire to secure by Letters Patent is:

1. In a machine tool table mechanism, a table, a pair of spaced crank pins pivotally connected to the table, a pair of first gears of the same size and on parallel axes, each containing a crank slot guiding one of the crank pins in relative motion toward and away from the center, the crank pins having the same relation to the center of each first gear, a screw mounted on each of the first gears in threaded relation to one of the crank pins and extending longitudinally of the slot adapted to move the crank pins toward and away from the center, gear means for turning both of the first gears in the same direction in unison, second gears each concentric with one of the first gears and of the same size, gear means for driving the second gears in the same direction in unison and gear means interconnecting each of the second gears with the screw on the adjoining first gear.

2. The machine tool table mechanism according to claim 1, in which the first gears are driven in one ratio and the second gears are driven in a second ratio to secure a combination of arcuate parallelogram motion and linear motion along an angular path.

3. In a machine tool table mechanism, a table, crank pins pivotally connected in spaced relation to the table, first gears of the same size on parallel axes each having a radial guideway which supports one of the crank pins, with the crank pins instantaneously at the same relation to the axis of each of the first gears, screws extending longitudinally of each guideway and threading with each crank pin, a first pinion intergeared with each of the first gears, second gears each concentric with one of the first gears and each of the same size having external gear teeth and crown gear teeth adjoining the first gears, a second pinion intergearing the second gears on their external gear teeth, third pinions intergearing the crown gear teeth of each second gear with one of the screws, means for turning the first pinion and the second pinion in unison and means for clamping the first pinion and turning the second pinion.

4. In a machine tool table mechanism, a table, crank pins pivotally connected in spaced relation to the table, first gears of the same size on parallel axes each having a radial guideway which supports one of the crank pins, with the crank pins instantaneously at the same relation to the axis of each of the first gears, screws extending longitudinally of each guideway and threading with each crank pin, a first pinion intergeared with each of the first gears, second gears each concentric with one of the first gears and each of the same size having external gear teeth and crown gear teeth adjoining the first gears, a second pinion intergearing the second gears on their external gear teeth, third pinions intergearing the crown gear teeth of each second gear with one of the screws, worm gear means including a first clutch disc for turning the first pinion, worm gear means including a second clutch disc for turning the second pinion, means for clamping the clutch discs together alternatively and means for clamping the first clutch disc rigidly while turning the second clutch disc to turn the second pinion.

5. In a machine tool table mechanism, a table, crank pins pivotally connected in spaced relation on the table, first gears of the same size on parallel axes each having a radial guideway which supports one of the crank pins, with the crank pins instantaneously at the same relation to the axis of each of the first gears, screws extending longitudinally of each guideway and threading with each crank pin, a first pinion intergeared with each of the first gears, second gears each concentric with one of the first gears and each of the same size having external gear teeth and crown gear teeth adjoining the first gears, a second pinion intergearing the second gears on their external gear teeth, third pinions intergearing the crown gear teeth of each second gear with one of the screws, a tubular shaft, a first clutch disc on the tubular shaft, a worm on the tubular shaft, a worm gear co-operating with the worm on the tubular shaft, a shaft connecting this first worm gear with the first pinion, a shaft extending through the tubular shaft, a second clutch disc on the shaft extending through the tubular shaft, a second worm on the shaft extending through the tubular shaft, a second worm gear cooperating with the second worm, a shaft interconnecting the second worm gear with the second pinion, means for selectively clamping the first and second clutch discs together and means for selectively clamping the first clutch disc in stationary position while leaving the second clutch disc free and means for turning the inner shaft.

6. A machine tool table mechanism according to claim 5, in which the first pinion and the second pinion are driven in a relatively unequal ratio which establishes a path combining arcuate parallelogram motion and straight motion at an angle.

7. In a machine tool mechanism, a tool having a radius of curvature of a cutting surface, and adapted to move relatively with respect to work and cut the work, and a work table supporting one of the tool and the work, comprising a table bed and a pair of cranks of the same length pivotally connected to the table bed, adjustable to determine the dimensions of opposite sides of the parallelogram, and swingable about crank centers to determine different points of contact between the tool and the work, in which the radius of each of the cranks has a setting which is equal to the sum of the radius of curvature of the tool and the desired radius of curvature of a convex curved portion of the work.

8. In machine tool mechanism, a tool having a radius of curvature of a cutting surface, and adapted to move relatively with respect to work and cut the work, and a work table supporting one of the tool and the work, comprising a table bed and a pair of cranks of the same length pivotally connected to the table bed, adjustable to determine the dimensions of opposite sides of the parallelogram, and swingable about crank centers to determine different points of contact between the tool and the work, in which the radius of each of the cranks has a setting which is equal to the radius of desired curvature of a concave contour on the work minus the radius of curvature of the cutting portion of the tool.

References Cited in the file of this patent

UNITED STATES PATENTS

| | | |
|---|---|---|
| 1,241,964 | Grow et al. | Oct. 2, 1917 |
| 1,632,600 | Hoagland | June 14, 1927 |
| 1,931,143 | Feit | Oct. 17, 1933 |
| 2,581,980 | Suber | Jan. 8, 1952 |

FOREIGN PATENTS

| | | |
|---|---|---|
| 359,320 | France | Mar. 21, 1906 |